F. NENZEL.
AMMONIA PURIFIER FOR REFRIGERATING PLANTS.
APPLICATION FILED SEPT. 25, 1909.
950,491.
Patented Mar. 1, 1910.
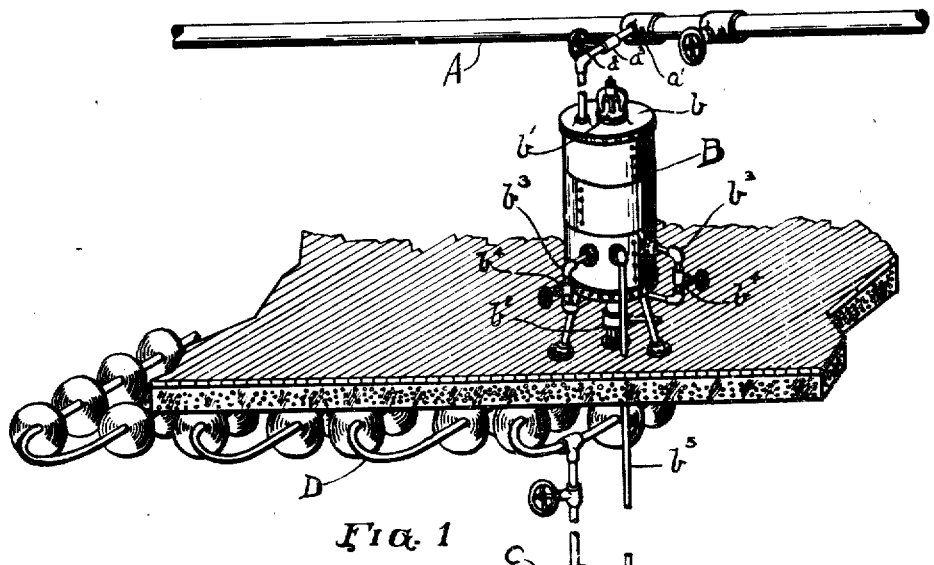
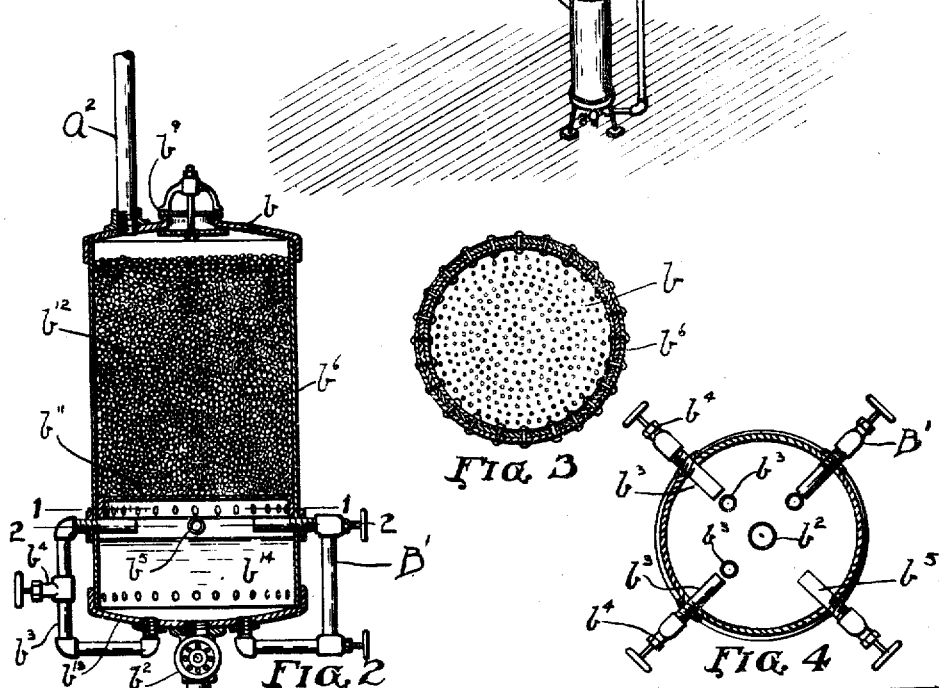
WITNESSES
W. Thornton Bogert
B. F. Wropf.
INVENTOR
Frederick Nenzel
By Walter F. Murray
ATTORNEY

UNITED STATES PATENT OFFICE.

FREDERICK NENZEL, OF CINCINNATI, OHIO.

AMMONIA-PURIFIER FOR REFRIGERATING PLANTS.

950,491.     Specification of Letters Patent.     Patented Mar. 1, 1910.

Application filed September 25, 1909. Serial No. 519,525.

*To all whom it may concern:*

Be it known that I, FREDERICK NENZEL, a citizen of the United States of America, and resident of Cincinnati, Hamilton county, State of Ohio, have invented certain new and useful Improvements in Ammonia-Purifiers for Refrigerating Plants, of which the following is a specification.

This invention relates to the purification of ammonia, by means of caustic soda and vacuum suction.

The object of this invention is to free the ammonia from all impurities, without losing any of the ammonia, and to give it new life and strength, while in use in the plant.

For a clear understanding of the merits of this invention, reference is made to the accompanying drawing, in which, Figure 1 is a perspective view of an ammonia purifier embodying my invention, and the interior of a refrigerating room, or cellar, being shown in section. Fig. 2 is a vertical sectional view of the purifier embodying my invention. Fig. 3 is a sectional view taken on line 1—1 of Fig. 2, showing the perforated plate of the caustic soda chamber. Fig. 4 is a sectional view taken on line 2—2 Fig. 2 and looking toward the bottom of the tank.

Referring to the drawing, by letters, the following is a description of same.

A purifier B for the ammonia gases is located between coils D of the refrigerating system and a suction pipe A, which may communicate with any suitable exhauster (not shown). The purifier consists of a cylindrical shell, a top plate $b$ and a bottom plate $b^{13}$, and is divided into a purifying chamber $b^{12}$ and a sediment chamber $b^{14}$ by a perforated plate $b^{11}$. The purifying chamber $b^{12}$ is filled with caustic soda, which is supported by the perforated plate, and the upper part of this chamber communicates with the suction pipe, A, through a pipe $a^2$, which is provided with a valve $a^3$.

A trap C communicates, through suitable piping, with the lowest point of the system of ammonia coils and through the delivery pipe $b^5$ with the sediment chamber $b^{14}$ of the purifier. The pipe $b^5$ projects through the cylindrical shell of the purifier into the top portion of the sediment chamber, immediately below the perforated plate $b^{11}$.

A blow-off pipe is secured to the bottom plate $b^{13}$ and communicates with the lowest point of the sediment chamber. The blow-off pipe is provided with a blow-off valve $b^2$ for controlling the discharge of sediment from the chamber. By-pass pipes $b^3$ are provided for the purpose of causing an agitation of the sediment contained in the chamber $b^{14}$. These pipes project through the bottom plate $b^{13}$, extend around the outside of the purifier and project through the cylindrical shell into the upper portion of the chamber $b^{14}$ at points immediately below the perforated plate $b^{11}$. Each by-pass valve may be provided with a valve $b^4$. A gage glass B' communicates with the sediment chamber for the purpose of indicating the agitation which takes place in that chamber, and for also indicating the amount of sediment contained in the chamber. A man-hole $b'$ is provided in the top plate $b$ and is closed by a suitable cover $b^9$.

Having thus described the parts, a description of the operation of the purifier is as follows: The liquid ammonia having circulated through the coils, D, and become evaporated, is passed back through the large suction pipe, A, to the compressor, and thence to the cooling tower, and back through the system, D, etc. The impurities or sediment collect at the lowest point in the refrigerating system, at which point I insert the trap C for collecting them and delivering them to the purifier. Originally, this matter was withdrawn from the trap and thrown away. These impurities containing great quantities of ammonia are drawn up to the chamber ($b^{14}$), through pipe ($b^5$), and deposited in the bottom of cylinder, B. The vacuum produced in the interior of the cylinder, B, causes evaporation of ammonia from the surface of the mixture of ammonia and impurities in the bottom chamber ($b^{14}$). This evaporation causes a crust of soggy impurities to be left at the top of the mass, and thus evaporation is carried on very slowly. A provision is made for more rapid evaporation, however. The valves ($b^4$) in the pipes ($b^3$) are opened and the liquid ammonia and impurities below the top crust are drawn through these pipes ($b^3$). The ammonia is evaporated and the impurities collect upon the surface of the matter in the chamber ($b^{14}$). The ammonia after being evaporated from the said impurities, passes through the caustic soda in the chamber ($b^{12}$), and is cleansed of all traces of foul matter. It then passes out through the pipe ($a^2$) to the main suction, A.

What I claim is:

1. In an ammonia purifier for refrigerating plants, the combination of ammonia coils, a suction pipe, a trap connected to the end of the ammonia coils, a casing, a chamber within the casing, adapted to retain a substance adapted to filter gas, a pipe connecting the bottom of the casing and the trap, and a pipe connecting the top of the casing and the suction pipe, whereby the impurities are drawn from the trap into the bottom of the casing, and the ammonia is withdrawn from the impurities in the bottom of the casing.

2. In an ammonia purifier for refrigerating plants, the combination of ammonia coils, a suction pipe, a trap connected to the end of the ammonia coils, a casing, a perforated plate within the casing above the bottom thereof, a filtering material supported by the perforated plate, a pipe connecting the bottom of the casing and the trap, and a pipe connecting the top of the casing and the suction pipe, whereby the impurities are drawn from the trap into the bottom of the casing, and the ammonia is withdrawn from the impurities in the bottom of the casing.

3. A filter for ammonia consisting of a casing, a perforated plate supported upon the interior of the casing, caustic soda supported upon the plate, pipes leading from the bottom of the casing and terminating upon the interior of the casing at a point beneath the plate, a pipe adapted to connect the bottom of the casing with a receptacle holding the material to be purified, and a pipe adapted to connect the top of the casing with a suction pipe.

4. In an ammonia purifier for refrigerating plants, the combination of ammonia coils, a trap adapted to collect impurities, connected to the ammonia coils, a suction pipe, a casing interposed between the trap and the suction pipe, a plate within the casing above the bottom thereof a filtering substance located on said plate, a pipe connecting the bottom of the casing with the trap, and a pipe connecting the top of the casing with the suction pipe, whereby impurities mixed with ammonia are withdrawn from the trap and into the bottom of the casing, and the ammonia is separated from the impurities and drawn through the filtering substance and into the suction pipe.

5. In a refrigerating plant, the combination of a system of ammonia coils, a suction pipe, a casing interposed between the system of coils and the suction pipe, a perforated plate within the casing above the bottom thereof a filtering substance supported by said plate, a pipe communicating with the bottom of the casing below said plate and the lowest point of said system of coils, and a pipe communicating with the top of the casing above said substance and with the suction pipe, whereby impurities mixed with the ammonia are withdrawn from the lowest point of the system of coils into the bottom of the casing and ammonia is separated from the impurities and drawn into the suction pipe.

6. In a refrigerating plant a suction pipe, a system of ammonia coils, a purifier for ammonia gas located between said coils and said suction pipe, comprising a casing, a purifying substance located within said casing, a space below said substance communicating with the system of coils, and a by-pass pipe communicating with the bottom of the space and projecting into the casing immediately below said filtering substance, and piping communicating with said casing above said substance and with said suction pipe.

7. In a refrigerating plant the combination of a system of ammonia coils, a suction pipe, a casing interposed between the system of coils and the suction pipe, caustic soda contained within said casing, a pipe communicating with said casing below the caustic soda and with the lowest point of said system of coils, and a pipe communicating with said casing above said caustic soda and with said suction pipe, whereby impurities mixed with the ammonia are withdrawn from the system of coils into the bottom of the casing, and ammonia is separated from the impurities, drawn through the caustic soda and into the suction pipe.

FREDERICK NENZEL.

Witnesses:
WALTER F. MURRAY,
B. R. KROPF.